(12) United States Patent
Huang et al.

(10) Patent No.: US 10,759,382 B2
(45) Date of Patent: Sep. 1, 2020

(54) LOCK APPARATUS AND VEHICLE USING THE SAME

(71) Applicant: Gogoro Inc., Hong Kong (CN)

(72) Inventors: Jung-Chi Huang, Taoyuan (TW); Chia-Hao Chang, New Taipei (TW); Yu-Min Chen, New Taipei (TW)

(73) Assignee: Gogoro Inc., Hong Kong (CN)

( * ) Notice: Subject to any disclaimer, the term of this patent is extended or adjusted under 35 U.S.C. 154(b) by 56 days.

(21) Appl. No.: 15/987,629

(22) Filed: May 23, 2018

(65) Prior Publication Data

US 2018/0345906 A1    Dec. 6, 2018

Related U.S. Application Data

(60) Provisional application No. 62/510,200, filed on May 23, 2017.

(51) Int. Cl.
*B60R 25/0215* (2013.01)
*B60R 25/021* (2013.01)
(Continued)

(52) U.S. Cl.
CPC .. *B60R 25/02153* (2013.01); *B60R 25/02126* (2013.01); *B62H 5/06* (2013.01); *B60R 2325/306* (2013.01)

(58) Field of Classification Search
CPC ........ B60R 25/02153; B60R 25/02126; B60R 2325/306; B60R 25/20; B62H 5/06
(Continued)

(56) References Cited

U.S. PATENT DOCUMENTS 3,151,698 A * 10/1964 Pollock ................... E05B 77/12
                                                                180/281
3,792,888 A *  2/1974 Kambic .............. E05B 47/0002
                                                                292/173
(Continued)

FOREIGN PATENT DOCUMENTS

DE          69908238      3/2004
DE        102005030783    3/2006
(Continued)

OTHER PUBLICATIONS

Office Action received for Japanese Patent Application No. 2018-098360; Applicant: Gogoro Inc., dated May 14, 2019, 5 pages.
(Continued)

*Primary Examiner* — Lloyd A Gall
(74) *Attorney, Agent, or Firm* — Perkins Coie LLP

(57) ABSTRACT

A lock apparatus includes a bracket, an engagement module, and an actuation module. The engagement module is supported in the bracket and has an engagement member configured to move to a first position or a second position in a first axial direction along the first axial direction. The actuation module is connected to the bracket and includes a pushing member. The actuation module drives the pushing member to move to a first position or a second position in the second axial direction along the second axial direction. When the pushing member is at the first position in the second axial direction, the engagement member is at the first position in the first axial direction. When the pushing member is at the second position in the second axial direction, the engagement member is at the second position in the first axial direction.

20 Claims, 13 Drawing Sheets

(51) Int. Cl.
*B62H 5/06* (2006.01)
*B60R 25/20* (2013.01)

(58) Field of Classification Search
USPC ............ 70/182–186, 252, 277, 278.7, 279.1, 70/280–283, 283.1; 292/144
See application file for complete search history.

(56) References Cited

U.S. PATENT DOCUMENTS

| | | | | |
|---|---|---|---|---|
| 3,893,723 | A * | 7/1975 | Boule | E05B 47/0002 292/140 |
| 3,897,093 | A * | 7/1975 | Wiczer | E05B 47/0002 292/144 |
| 4,232,537 | A * | 11/1980 | Plaiss | B62H 5/003 70/185 |
| 4,387,582 | A * | 6/1983 | Meunier | B60R 25/02126 70/186 |
| 4,552,000 | A * | 11/1985 | Lipschutz | B60R 25/02105 292/341.15 |
| 4,557,121 | A * | 12/1985 | Charlton | E05B 47/0002 70/129 |
| 4,634,155 | A * | 1/1987 | Geringer | E05B 17/22 292/144 |
| 4,677,834 | A * | 7/1987 | Hicks | E05B 47/0002 292/144 |
| 5,100,186 | A * | 3/1992 | Nordvall | E05B 47/0046 292/341.16 |
| 5,493,881 | A * | 2/1996 | Harvey | E05B 47/0607 292/144 |
| 5,896,769 | A * | 4/1999 | Elpern | E05B 47/0012 70/279.1 |
| 6,079,755 | A * | 6/2000 | Chang | E05B 47/0002 292/144 |
| 8,424,348 | B2 * | 4/2013 | Dimig | B60R 25/00 70/182 |
| 2002/0135188 | A1 * | 9/2002 | Chang | E05B 47/0002 292/144 |
| 2004/0207210 | A1 * | 10/2004 | Luker | E05B 63/0013 292/144 |
| 2005/0183480 | A1 * | 8/2005 | Hingston | E05B 47/0002 70/279.1 |
| 2006/0042334 | A1 * | 3/2006 | Huang | E05B 47/0002 70/279.1 |
| 2014/0373665 | A1 * | 12/2014 | Dimig | B60R 25/0215 74/495 |

FOREIGN PATENT DOCUMENTS

| | | |
|---|---|---|
| DE | 102006059282 | 6/2008 |
| DE | 102007002451 | 7/2008 |
| GB | 2300609 | 11/1996 |
| JP | 2006021668 A | 1/2006 |

OTHER PUBLICATIONS

European Patent Office, EP Application No. 18173820.4, European Search Report dated Oct. 23, 2018, 5 pages.

* cited by examiner

LOCK APPARATUS AND VEHICLE USING THE SAME

CROSS-REFERENCE TO RELATED APPLICATION

This application claims priority to U.S. Provisional Application Ser. No. 62/510,200, filed May 23, 2017, which is herein incorporated by reference.

BACKGROUND

Technical Field

The present disclosure relates to a lock apparatus, and more particularly, to a lock apparatus used in a vehicle.

Description of Related Art

Motorcycles are common vehicles nowadays due to theft advantages on high mobility. In general, the front wheel of a motorcycle is coupled to the steering shaft, and the steering shaft is coupled to the handle of the motorcycle. In this way, the rider can control the direction of the motorcycle by turning the handle of the motorcycle.

In order to prevent pilferage, a motorcycle usually includes an ignition-lock structure which can be fixed to the steering shaft to prevent others from operating the handle of the motorcycle and stealing motorcycle. A traditional motorcycle directly uses a mechanical ignition-lock structure to lock the steering shaft. For example, the ignition-lock structure is directly driven by a lock head structure. When the user inserts the key into the lock head structure and turns to a specific angle, the ignition-lock structure will also be driven to lock the steering shaft.

However, for motorcycles that use keyless start systems, they use wireless signal to enable the motorcycles rather than the traditional keys. As a result, the locking/unlocking architecture of the lock head structure by using a conventional key to drive the ignition structure can no longer be used.

Accordingly, how to provide an ignition-lock structure that can be applied to motorcycles using keyless start systems becomes an important issue to be solved by those in the industry.

SUMMARY

An aspect of the disclosure is to provide a lock apparatus that can be used in a vehicle using a keyless start system.

According to an embodiment of the disclosure, a lock apparatus includes a bracket, an engagement module, and an actuation module. The engagement module is supported in the bracket and has an engagement member configured to move to a first position in a first axial direction or a second position in the first axial direction relative to the bracket substantially along the first axial direction. The actuation module is connected to the bracket and includes a pushing member. The actuation module drives the pushing member to move to a first position in a second axial direction or a second position in the second axial direction relative to the engagement module substantially along the second axial direction that is not parallel to the first axial direction. When the pushing member is located at the first position in the second axial direction, the engagement member is located at the first position in the first axial direction. When the pushing member is located at the second position in the second axial direction, the engagement member is located at the second position in the first axial direction.

In an embodiment of the disclosure, the first position in the first axial direction is an unlock position, and the second position in the first axial direction is a lock position.

In an embodiment of the disclosure, the engagement module further includes a first linkage. Two ends of the first linkage are respectively connected to the engagement member and the pushing member.

In an embodiment of the disclosure, the pushing member has a first pushing portion. When the pushing member is located at the first position in the second axial direction, the first pushing portion is separated from the engagement module. When the pushing member moves from the first position in the second axial direction to the second position in the second axial direction, the first pushing portion pushes the engagement module to move the engagement member to the lock position.

In an embodiment of the disclosure, the pushing member further has a second pushing portion connected to the first pushing portion. When the second pushing portion contacts the engagement module, the engagement member is located at the unlock position.

In an embodiment of the disclosure, the first axial direction is substantially perpendicular to the second axial direction. The first pushing portion and the second pushing portion are substantially parallel to the second axial direction and form a height difference in the first axial direction.

In an embodiment of the disclosure, the pushing member further has a step portion. The second pushing portion is connected to the first pushing portion through the step portion.

In an embodiment of the disclosure, the second pushing portion is a flat surface. The step portion is a curved surface. The curved surface is smoothly connected to the flat surface.

In an embodiment of the disclosure, the bracket further includes a first retaining member located at a side of the pushing member away from the engagement module. The first retaining member is configured to limit a movement of the pushing member away from the engagement module.

In an embodiment of the disclosure, the first retaining member is a screw fastened to the bracket.

In an embodiment of the disclosure, the bracket further includes a second retaining member. The second retaining member is configured to be abutted by the second pushing portion.

In an embodiment of the disclosure, the second retaining member includes a connecting block and a fastening member. The connecting block has a through hole. The second pushing portion is at least partially located in the through hole. The fastening member is fastened to the connecting block and partially protrudes into the through hole to be abutted by the second pushing portion.

In an embodiment of the disclosure, the engagement member includes a flange. The bracket includes a first frame body and a second frame body. The first frame body faces toward the actuation module. The second frame body faces away from the actuation module, is fixed to the first frame body, and forms an accommodating space with the first frame body. The engagement member passes through the first frame body and the second frame body. The flange is retained hi the accommodating space.

In an embodiment of the disclosure, the engagement module further includes a resilient member. The resilient member is located in the accommodating space and compressed between the second frame body and the flange.

In an embodiment of the disclosure, the engagement member further includes a pin portion. The pin portion is connected to the flange and protrudes out from the second frame body.

In an embodiment of the disclosure, the engagement member further includes a coupling portion. The coupling portion is connected to the flange and protrudes out from the first frame body. The first linkage further includes a sliding member. The sliding member is configured to be slidably pushed by the pushing member.

In an embodiment of the disclosure, the first linkage further includes a coupling pedestal. The sliding member is connected to the coupling portion through the coupling pedestal. The coupling pedestal is configured to abut against the first frame body.

In an embodiment of the disclosure, the engagement member passes through the bracket. The first linkage further includes a sliding member. The sliding member is coupled to an end of engagement member close to the pushing member and configured to be slidably abutted by the pushing member.

In an embodiment of the disclosure, the first linkage further includes a coupling pedestal. The sliding member is connected to the end of engagement member close to the pushing member through the coupling pedestal. The coupling pedestal is configured to abut against the bracket.

In an embodiment of the disclosure, the engagement module further includes a second linkage. Two ends of the second linkage are pivotally connected to the bracket and the first linkage, respectively.

In an embodiment of the disclosure, the first linkage is pivotally connected to the engagement member based on a first axis and pivotally connected to the pushing member based on a second axis. The second linkage is pivotally connected to the bracket based on a third axis and pivotally connected to the first linkage based on a fourth axis. The first axis, the second axis, the third axis, and the fourth axis are parallel to each other.

In an embodiment of the disclosure, the first axis is aligned with the third axis in the first axial direction. The second axis is aligned with the third axis in the second axial direction.

In an embodiment of the disclosure, the pushing member includes a main body, a sliding block, and a resilient member. The main body has a slide rail. The slide rail is substantially parallel to the second axial direction and has a first end and a second end. The actuation module drives the main body to move to the first position in the second axial direction or the second position in the second axial direction. The first end and the second end are respectively close to the first position in the second axial direction and the second position in the second axial direction. The sliding block slidably is coupled to the slide rail. The first linkage is pivotally connected to the sliding block. The resilient member is disposed between the main body and the sliding block and configured to push the sliding block toward the first end.

In an embodiment of the disclosure, the main body has a chamber. The sliding block is slidably disposed in the chamber. The first linkage passes into the chamber to pivotally connect the sliding block. The resilient member is compressed between the main body and the sliding block in the chamber.

In an embodiment of the disclosure, the actuation module is an electromagnetic switch and further includes a sleeve, a movable rod, an abutting ring, and a resilient member. The movable rod passes through the sleeve. The pushing member is coupled to an end of the movable rod. The abutting ring is mounted to another end of the movable rod away from the pushing member. The resilient member is abutted between the sleeve and the abutting ring.

According to another embodiment of the disclosure, a vehicle includes a frame, a steering shaft, and the foregoing lock apparatus. The frame has a bushing portion. The steering shaft is rotatably disposed in the bushing portion. The bracket is fixed to the bushing portion. When the engagement member is located at the lock position, the engagement member passes through the bushing portion and is engaged with the steering shaft. When the engagement member is located at the unlock position, the engagement member is separated from the steering shaft.

Accordingly, in the lock apparatus and the vehicle of the disclosure, the actuation module can drive the pushing member to push the engagement module, so as to achieve the purpose of moving the engagement member of the engagement module to the lock position or the unlock position. As such, the lock apparatus and the vehicle of the disclosure can adopt keyless start system. In the actuation method of moving the pushing member between two positions to move the engagement member, the moving direction of the engagement member can be designed to be distinct from the pushing direction of the pushing member. Moreover, the reverse impact force that the engagement module returns to the pushing member can be cushioned by the first retaining member, so as to effectively prevent the reverse impact force returned by the engagement module from directly damaging the actuation module. By retaining the pushing member with the second retaining member, the pushing member can be ensured to correctly contact the engagement module with the first pushing portion and the second pushing portion. By making the engagement member be abutted by the pushing member through the sliding member, the pushing member and the engagement member can effectively prevent from producing excessive wear and tear therebetween. By disposing the resilient member between the second frame body of the bracket and the flange of the engagement member, the engagement member can be ensured to return to the unlock position when the first pushing portion does not push the engagement module.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
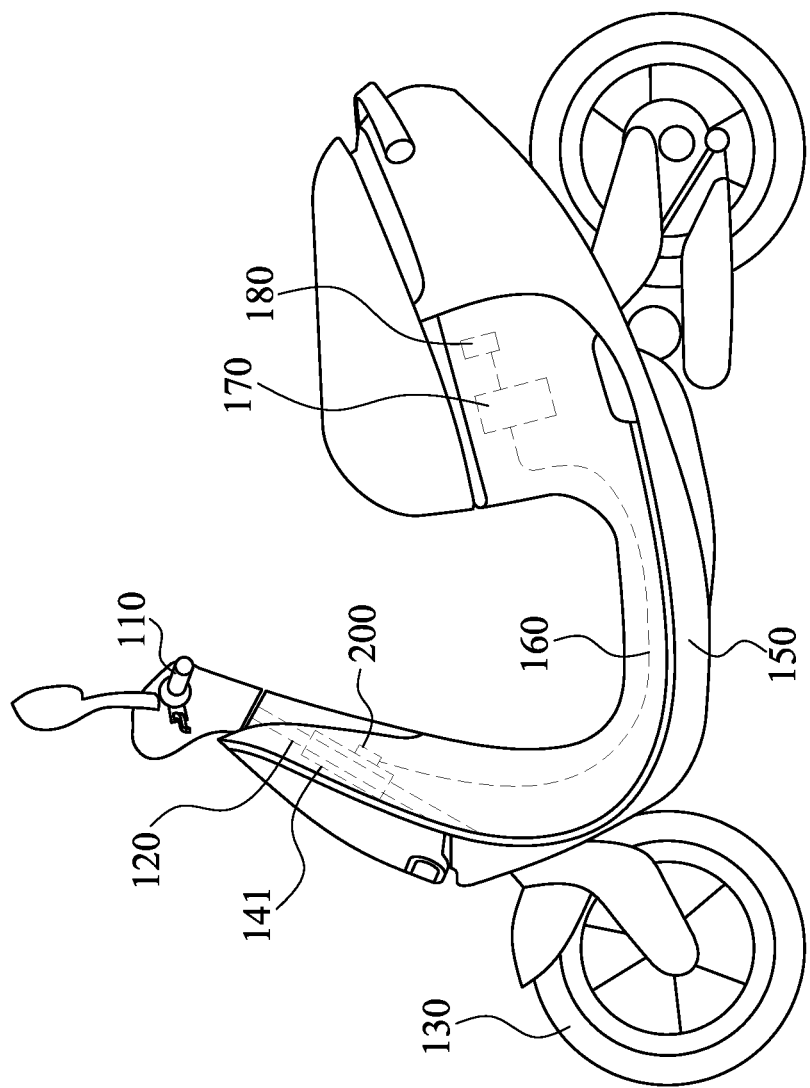
FIG. 1 is a side view of a vehicle according to some embodiments of the disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a side view of a vehicle 100 according to some embodiments of the disclosure. As shown in FIG. 1, the vehicle 100 (e.g., a straddle type vehicle) includes a steering handle 110, a steering shaft 120 (i.e., a steering or controlling joystick), a steering wheel 130, a body 150, a frame 140 (referring to FIG. 2A), and a lock apparatus 200. The steering shaft 120 is coupled to the steering handle 110 and the steering wheel 130. When a rider rotates the steering handle 110, the steering handle 110 rotates the steering wheel 130 through the steering shaft 120. The steering shaft 120, the frame 140, and the lock apparatus 200 are on the body 150, but the disclosure is not limited in this regard. The frame 140 has a bushing portion 141. The steering shaft 120 is rotatably disposed in the bushing portion 141. The lock apparatus 200 is fixed to the bushing portion 141 and is capable of passing through the bushing portion 141 to lock the steering shaft 120. Specifically, when the rider rotates the steering handle 110 to a specific orientation, the lock apparatus 200 can be used to lock the steering shaft 120, so as to prevent theft of the vehicle 100. For convenience of description, "locked state" recited below represents the state that the steering shaft 120 is locked by the lock apparatus 200 and is difficult to rotate, and "unlocked state" recited below represents the state that the steering shaft 120 is not locked by the lock apparatus 200 and is rotatable.

Figure 2A:
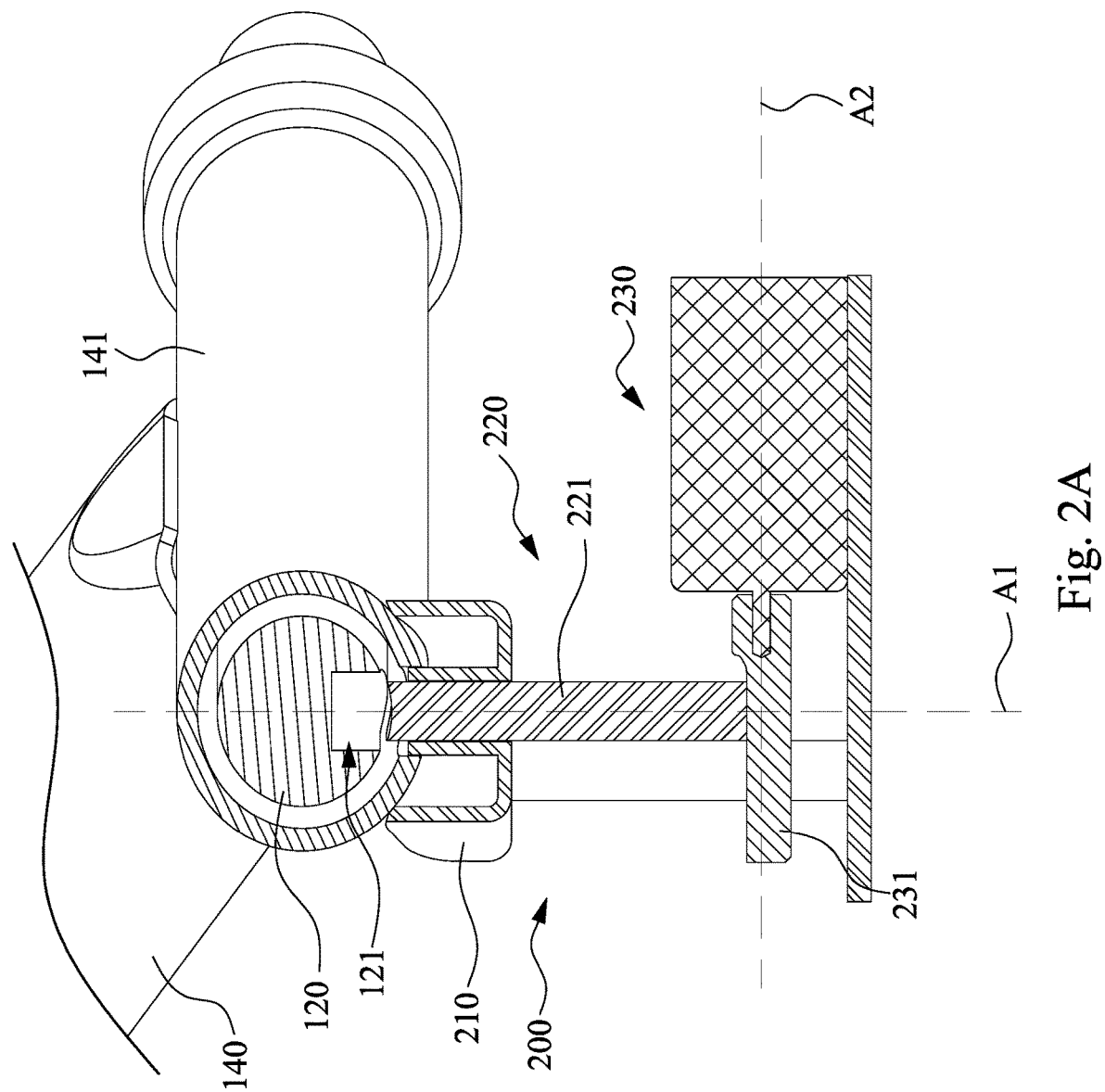
FIG. 2A is a cross-sectional view of a lock apparatus, a part of a frame, and a part of a steering shaft according to some embodiments of the disclosure, in which an engagement member is located at a first position in a first axial direction.
Figure 2B:
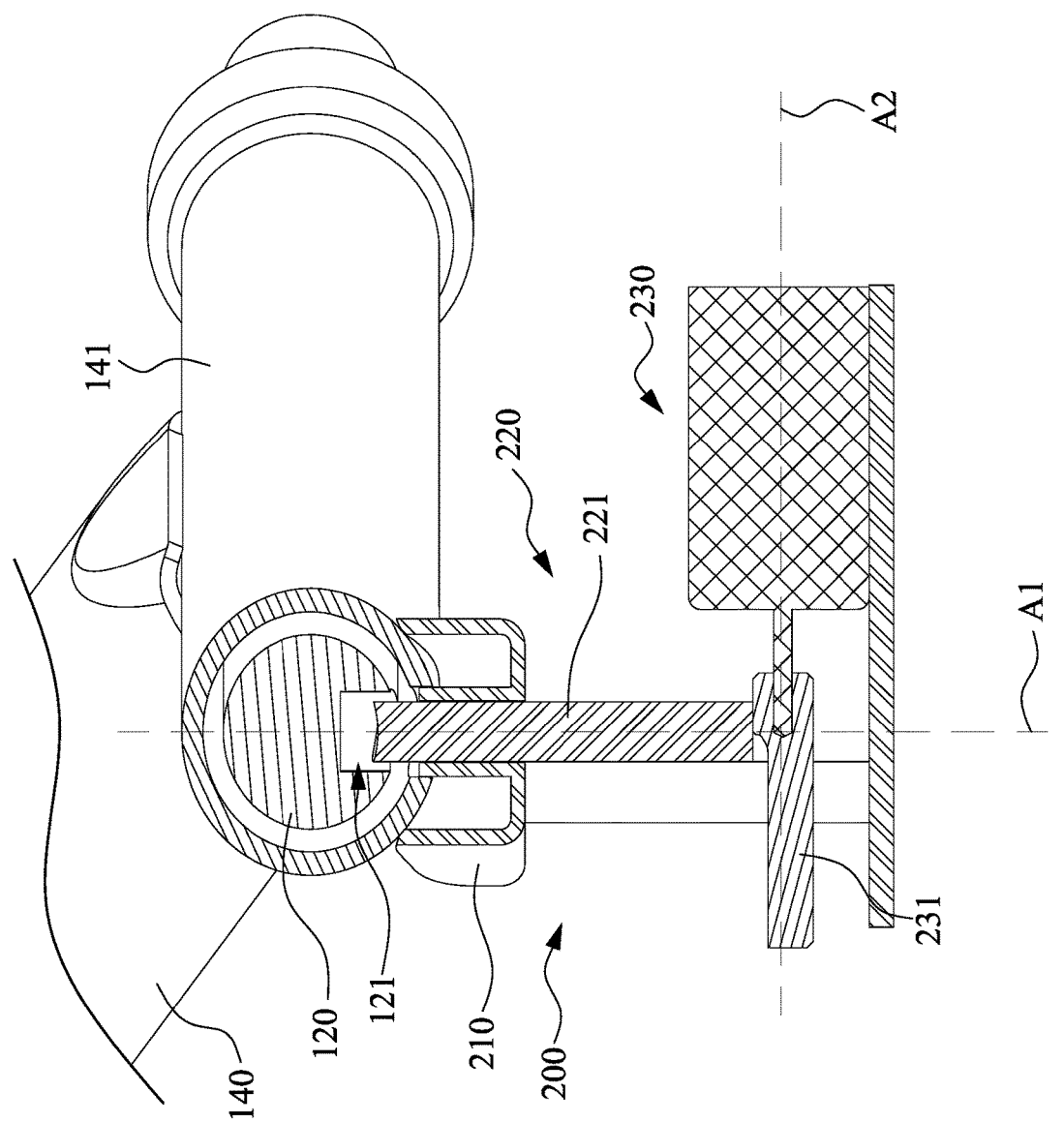
FIG. 2B is another cross-sectional view of the structure in FIG. 2A, in which the engagement member is located at a second position in the first axial direction.

Reference is made to FIGS. 2A and 2B. FIG. 2A is a cross-sectional view of the lock apparatus 200, a part of the frame 140, and a part of the steering shaft 120 according to some embodiments of the disclosure, in which an engagement member 221 is located at a first position in a first axial direction A1. FIG. 2B is another cross-sectional view of the structure in FIG. 2A, in which the engagement member 221 is located at a second position in the first axial direction A1. Structures and functions of components included in the lock apparatus 200 and connection and action relationships among these components are described in detail below.

As shown in FIGS. 2A and 2B, in some embodiments, the lock apparatus 200 includes a bracket 210, an engagement module 220, and an actuation module 230. The engagement module 220 is supported in the bracket 210 and has an engagement member 221. The engagement member 221 is configured to move to a first position in a first axial direction A1 (as shown in FIG. 2A) or a second position in the first axial direction A1 (as shown in FIG. 2B) relative to the bracket 210 substantially along the first axial direction A1. The actuation module 230 is connected to the bracket 210 and includes a pushing member 231. The actuation module 230 drives the pushing member 231 to move to a first position in a second axial direction A2 or a second position in the second axial direction A2 relative to the engagement module 220 substantially along the second axial direction A2 that is not parallel to the first axial direction A1 according to electric signals. When the pushing member 231 is located at the first position in the second axial direction A2 (i.e., the position of the pushing member 231 in FIG. 2A), the engagement member 221 is located at the first position in the first axial direction A1. When the pushing member 231 is located at the second position in the second axial direction A2 (i.e., the position of the pushing member 231 in FIG. 2B), the pushing member 231 pushes the engagement module 220 to move the engagement member 221 to the second position in the first axial direction A1. In some embodiments, when the pushing member 231 is located at the second position in the second axial direction A2, the engagement member 221 is located at the first position in the first axial direction A1, when the pushing member 231 is located at the first position in the second axial direction A2, the pushing member 231 pushes the engagement module 220 to move the engagement member 221 to the second position in the first axial direction A1, and the embodiment is described in detail below.

In some embodiments, the first position in the first axial direction A1 corresponds to, but is not limited to, the unlock position of the engagement member 221 shown in FIG. 2A, and the second position in the first axial direction A1 corresponds to, but is not limited to, the lock position of the engagement member 221 shown in FIG. 2B.

Figure 3:
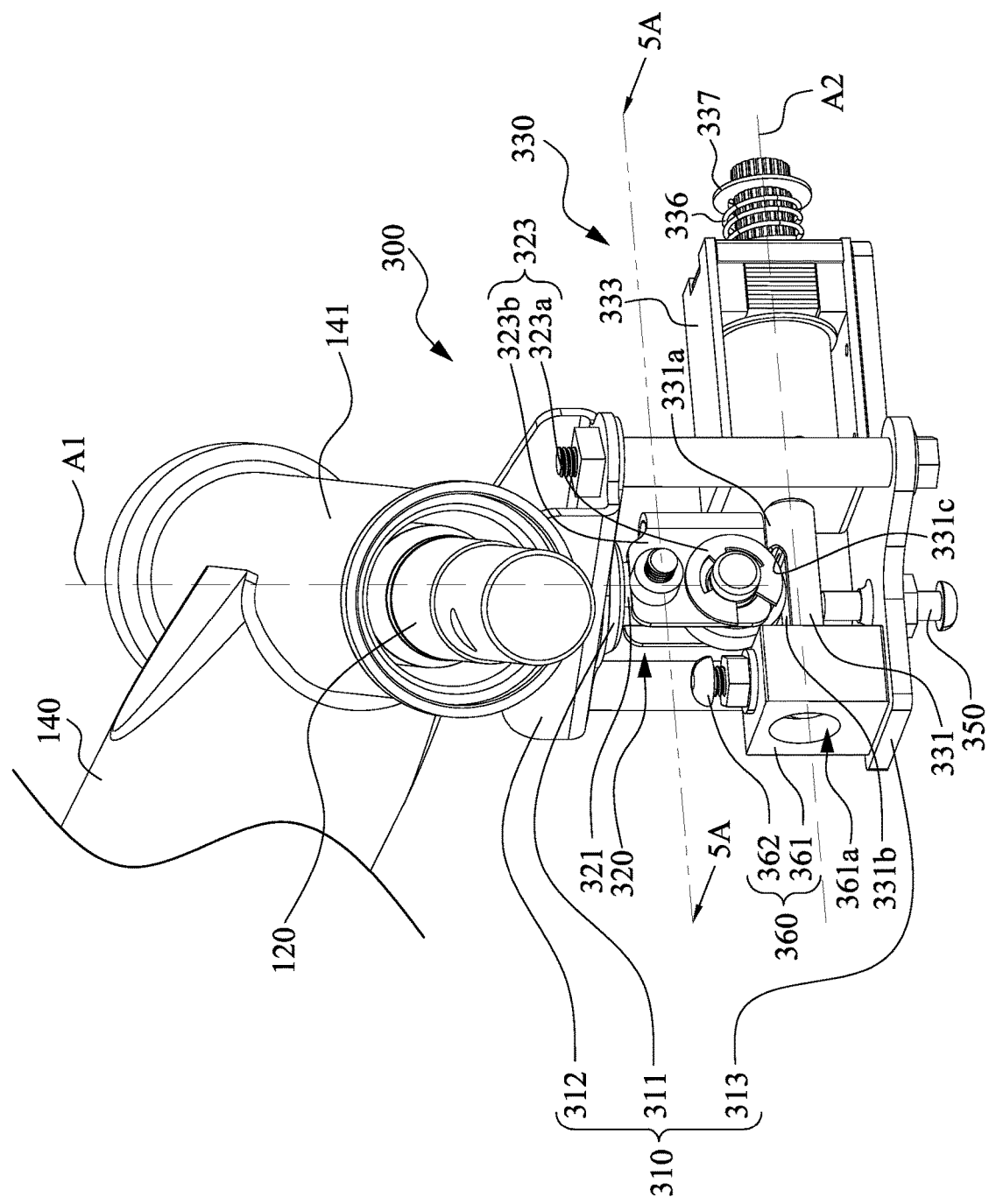
FIG. 3 is a perspective view of a lock apparatus, a part of the frame, and a part of the steering shaft according to some embodiments of the disclosure.
Figure 4:
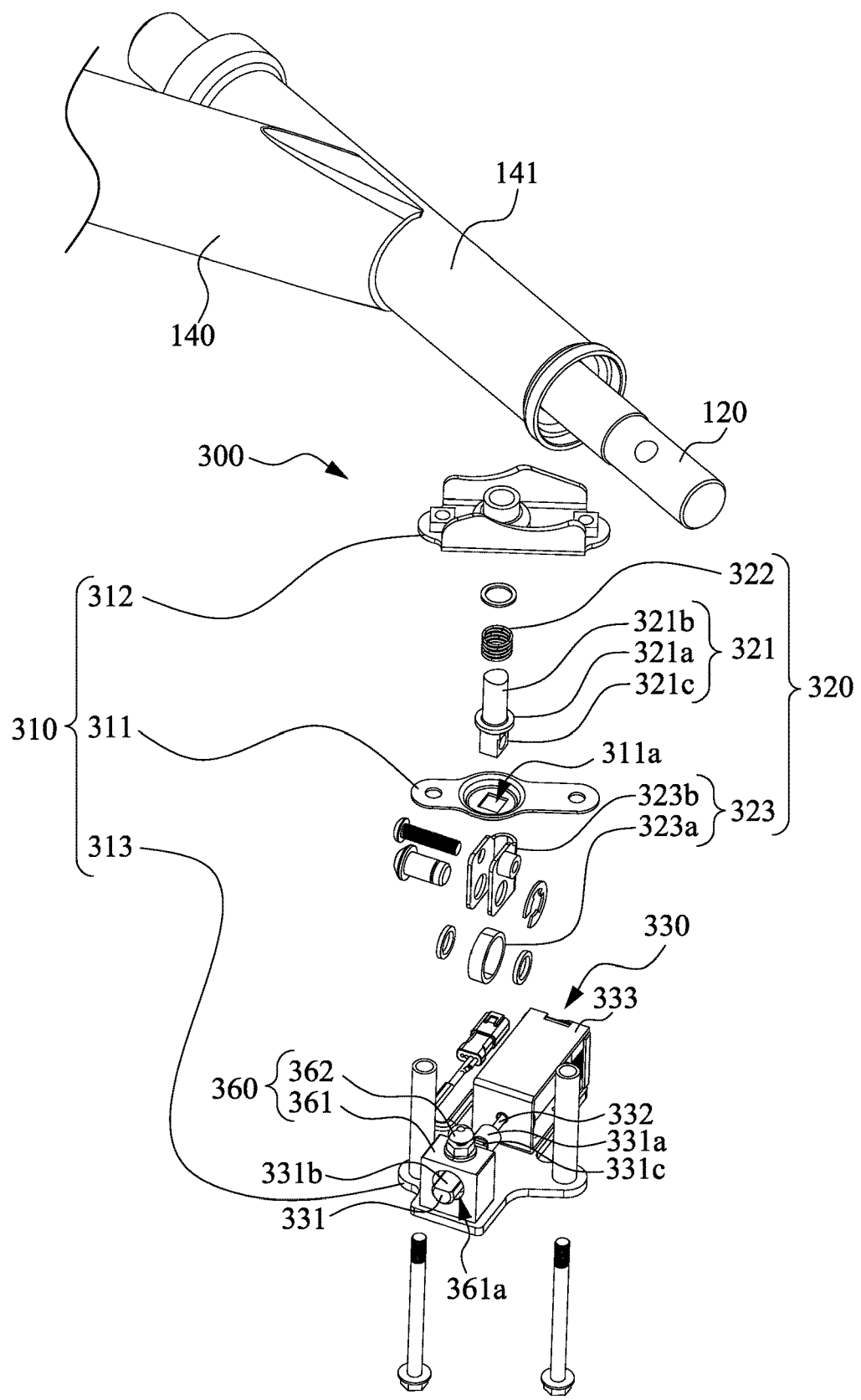
FIG. 4 is an exploded view of the lock apparatus, the part of the frame, and the part of the steering shaft in FIG. 3 according to some embodiments of the disclosure.
Figure 5A:
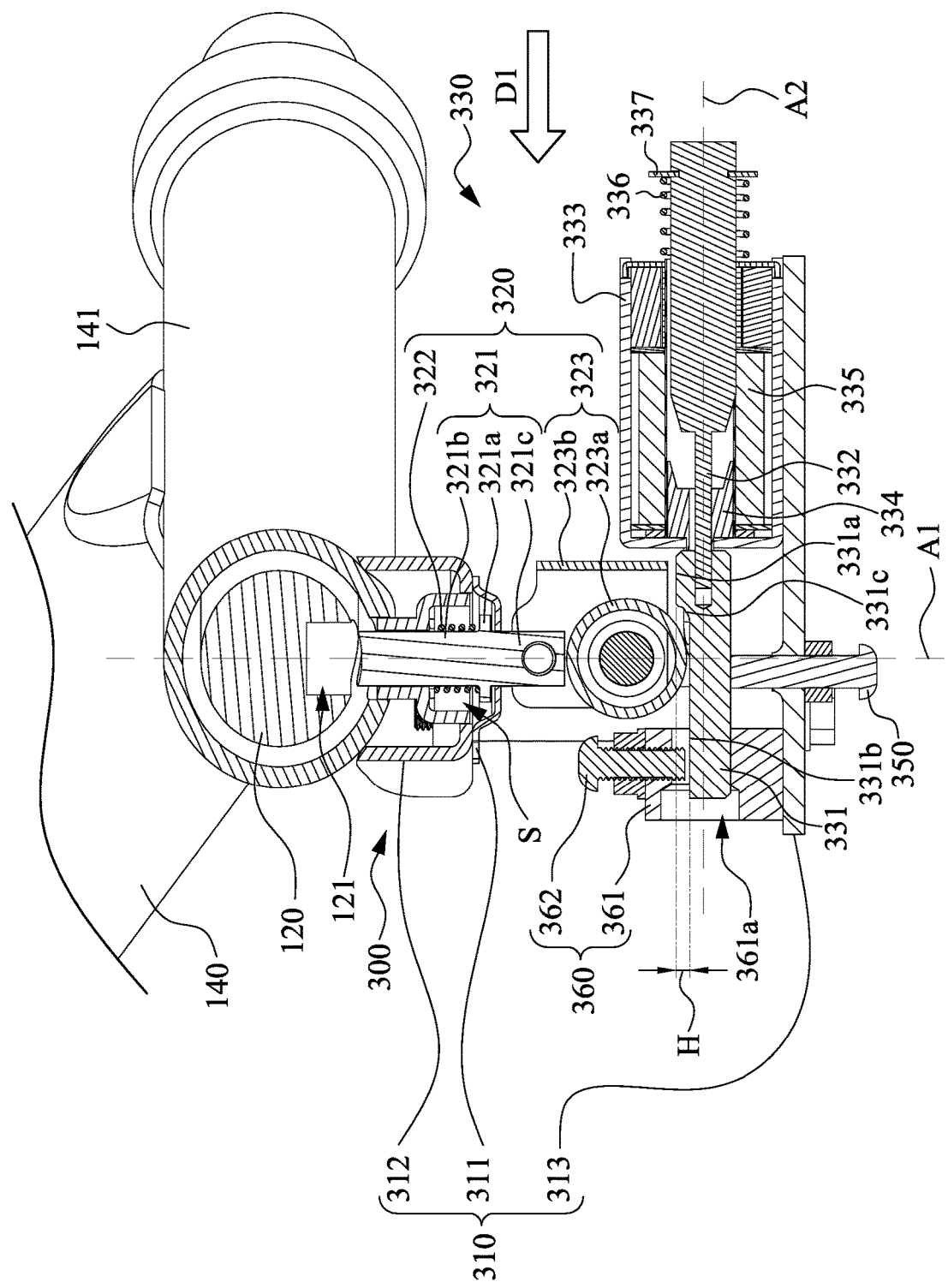
FIG. 5A is a cross-sectional view of the structure in FIG. 3 taken along line 5A-5A, in which the engagement member is located at an unlock position.
Figure 5B:
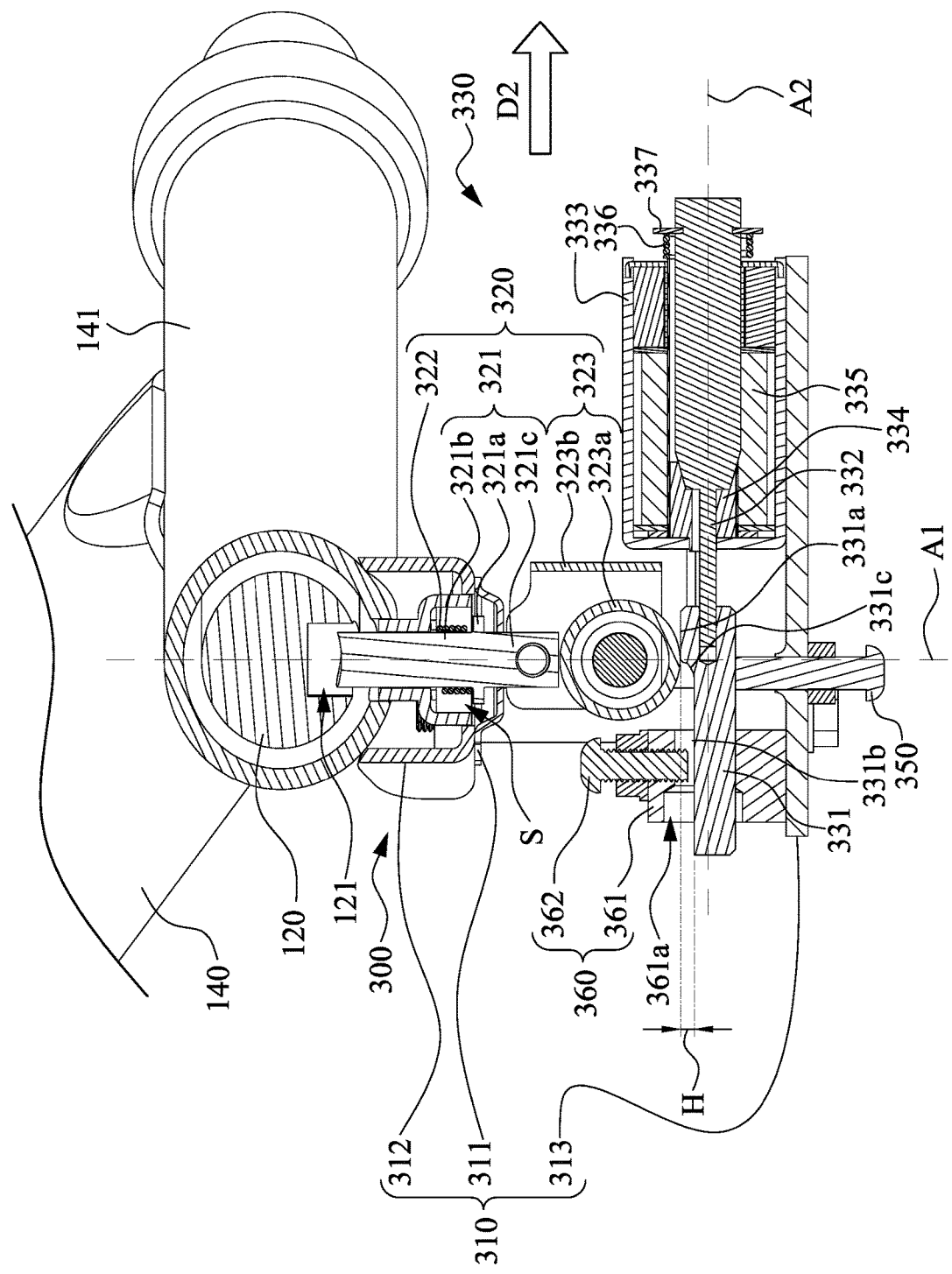
FIG. 5B is another cross-sectional view of the structure in FIG. 3 taken along line 5A-5A, in which the engagement member is located at a lock position.

Reference is made to FIGS. 3-5B. FIG. 3 is a perspective view of a lock apparatus 300, a part of the frame 140, and a part of the steering shaft 120 according to some embodiments of the disclosure. FIG. 4 is an exploded view of the lock apparatus 300, the part of the frame 140, and the part of the steering shaft 120 in FIG. 3 according to some embodiments of the disclosure. FIG. 5A is a cross-sectional view of the structure in FIG. 3 taken along line 5A-5A, in which the engagement member 321 is located at the unlock position. FIG. 5B is another cross-sectional view of the structure in FIG. 3 taken along line 5A-5A, in which the engagement member 321 is located at the lock position. Structures and functions of components included in the lock apparatus 300 and connection and action relationships among these components are described in detail below.

As shown in FIGS. 3-5B, in some embodiments, the pushing member 331 has a first pushing portion 331a. Specifically, the actuation module 330 makes the first pushing portion 331a push or leave the engagement module 320 according to electric signals. When the pushing member 331 is located at the first position in the second axial direction A2, the first pushing portion 331a is separated from the engagement module 320, the engagement member 321 is located at the unlock position (as shown in FIG. 5A), and the engagement member 321 does not insert into an engagement hole 121 of the steering shaft 120. When the pushing member 331 moves from the first position in the second axial direction A2 to the second position in the second axial direction A2, the first pushing portion 331a pushes the engagement module 320 to move the engagement member 321 to the lock position (as shown in FIG. 5B), and the engagement member 321 inserts into the engagement hole 121 of the steering shaft 120.

In some embodiments, the engagement member 321 is configured to move relative to the bracket 310 substantially along the first axial direction A1, the pushing member 331 is configured to move relative to the engagement module 320 substantially along the second axial direction A2, and the first axial direction A1 is substantially perpendicular to the second axial direction A2, but the disclosure is not limited in this regard. In practical applications, angular configuration between the first axial direction A1 and the second axial direction A2 can be correspondingly adjusted in accordance with different designs/interior spaces of the body 150.

As shown in FIGS. 5A and 5B, in some embodiments, the pushing member 331 further has a second pushing portion 331b and a step portion 331c. The step portion 331c is connected between the first pushing portion 331a and the second pushing portion 331b. The first pushing portion 331a and the second pushing portion 331b are substantially parallel to the second axial direction A2 and form a height difference H in the first axial direction A1. Therefore, the purpose of making the first pushing portion 331a push or leave the engagement module 320 can be achieved during the movement of the pushing member 331 along the engagement module 320 along the second axial direction A2.

As shown in FIG. 5A, in some embodiments, when the pushing member 331 is located at the first position in the second axial direction A2, the first pushing portion 331a is separated from the engagement module 320, and the engagement module 320 is separately located over the second pushing portion 331b, but the disclosure is not limited in this regard. In some other embodiments, the shape of the pushing member 331 can be modified, so that the pushing member 331 can contact the engagement module 320 with the first pushing portion 331a and the second pushing portion 331b respectively at different times. When the pushing member 331 is located at the first position in the second axial direction A2, the second pushing portion 331b contacts the engagement module 320 (can be referred to FIG. 5A without providing another drawing). When the pushing member 331 moves from the first position in the second axial direction A2 to the second position in the second axial direction A2, the first pushing portion 331a pushes the engagement module 320 to move the engagement member 321 to the lock position (as shown in FIG. 5B). Therefore, the engagement module 320 continuously contacts the pushing member 331 during the movement of the pushing member 331, so as to smooth the force transmitted between the pushing member 331 and the engagement module 320 and reduce the impact that the pushing member 331 applies to the engagement module 320 during the movement of the pushing member 331.

In some embodiments, the second pushing portion 331b is a flat surface, the step portion 331c is a curved surface, and the curved surface is smoothly connected to the second pushing portion 331b, but the disclosure is not limited in this regard. Therefore, the engagement module 320 can smoothly move from the second pushing portion 331b to the first pushing portion 331a, and the impact that the pushing member 331 applies to the engagement module 320 during the movement of the pushing member 331 can be reduced.

In some embodiments, the shape of the pushing member 331 is a part of a cylinder, the first pushing portion 331a is a part of the cylindrical surface of the cylinder, and the second pushing portion 331b and the step portion 331c are portions of the cylinder formed by removing a part of the cylinder, but the disclosure is not limited in this regard. In some other embodiments, the first pushing portion 331a can be a flat surface to steadily contact the engagement module 320. In some other embodiments, the step portion 331c is a curved surface smoothly connected to the first pushing portion 331a. In some embodiments, the step portion 331c can be a flat surface and obliquely connected between the first pushing portion 331a and the second pushing portion 331b.

As shown in FIG. 3, in some embodiments, the bracket 310 includes a first frame body 311, a second frame body 312 (referring to FIGS. 5A and 5B), and a supporting frame body 313. The supporting frame body 313 is fixed to the first frame body 311 and the second frame body 312 (e.g., by screws), but the disclosure is not limited in this regard. Structures and functions of the first frame body 311 and the second frame body 312 and connection relationships between any two of the first frame body 311, the second frame body 312, and other components are described in detail below.

As shown in FIGS. 5A and 5B, in some embodiments, the bracket 310 limits the movement of the pushing member 331 away from the engagement member 321. The bracket 310 further includes a first retaining member 350. The actuation module 330 is fixed to the bracket 310. The first retaining member 350 is disposed on the bracket 310 and located at a side of the pushing member 331 away from the engagement module 320. The first retaining member 350 is configured to limit a movement of the pushing member 331 away from the engagement module 320 along the first axial direction A1.

In some embodiments, the first retaining member 350 is a screw fastened to the bracket 310 (i.e., meshed with tread structure). Therefore, a distance of the first retaining member 350 extending toward the pushing member 331 can be adjusted by rotating the first retaining member 350, so as to comply with different shapes of the pushing member 331. In some other embodiments, the first retaining member 350 can contact the pushing member 331 through a roller or a bearing, so as to prevent excessive wear and tear produced between the first retaining member 350 and the pushing member 331.

However, the disclosure is not limited in this regard. In some other simplified embodiments, the first retaining member 350 is a protruding portion extended from the bracket 310 (i.e., not adjustable). In some other embodiments, the protruding portion has a certain degree of softness, so as to absorb the reverse impact force that the engagement module 320 returns to the pushing member 331. For example, the protruding portion can be a rubber piece, but the disclosure is not limited in this regard. In some other embodiments, the shape of the protruding portion can approximate a sphere, so as to prevent from producing excessive wear and tear while contacting the pushing member 331.

As shown in FIGS. 4 and 5A, in some embodiments, the bracket 310 further includes a second retaining member 360. The second retaining member 360 is configured to be abutted by the second pushing portion 331b so as to limit the rotation of the pushing member 331 around about the second axial direction A2. In some embodiments, the second pushing portion 331b is a flat surface, a surface of the second retaining member 360 facing toward the second pushing portion 331b is substantially a flat surface, and a gap is formed between the two flat surfaces, so as to avow the pushing member 331 to perform a limited rotation relative to the second retaining member 360 about the second axial direction A2. In some other embodiments, the second retaining member 360 can directly abut against the second pushing portion 331b, so as to ensure that the pushing member 331 cannot rotate about the second axial direction A2.

In some embodiments, the second retaining member 360 includes a connecting block 361 and a fastening member 362. The connecting block 361 has a through hole 361a. The second pushing portion 331b is at least partially located in the through hole 361a. The fastening member 362 is fastened to the connecting block 361 and partially protrudes into the through hole 361a to be abutted by the second pushing portion 331b. In some embodiments, the fastening member 362 is a screw. Therefore, a distance of the fastening member 362 extending from the inner wall of the through hole 361a toward the second pushing portion 331b can be adjusted by rotating the fastening member 362, so as to comply with different shapes of the pushing member 331, but the disclosure is not limited in this regard. In some simplified embodiments, the second retaining member 360 is a protruding portion extended from the bracket 310 (i.e., not adjustable) and extends over the second pushing portion 331b to be abutted by the second pushing portion 331a. In some other embodiments, the protruding portion can be a one-piece structure.

As shown in FIGS. 5A and 5B with reference to FIG. 3, in some embodiments, the first frame body 311 faces toward the actuation module 330. The second frame body 312 faces away from the actuation module 330, is fixed to the first frame body 311, and forms an accommodating space S with the first frame body 311. The engagement member 321 includes a flange 321a, a pin portion 321b, and a coupling portion 321c. The flange 321a is connected between the pin portion 321b and the coupling portion 321c. The engagement member 321 passes through the first frame body 311 and the second frame body 312. The flange 321a is retained in the accommodating space S. The engagement module 320 further includes a resilient member 322. The resilient member 322 is located in the accommodating space S and compressed between the second frame body 312 and the flange 321a. In some embodiments, the second frame body 312 can be welded to the bushing portion 141 of the frame 140 using a welding process, so as to fix the bracket 310 to the frame 140, but the disclosure is not limited in this regard.

According to the foregoing structural configurations, the pushing member 331 makes the first pushing portion 331a push the engagement module 320 when the lock apparatus 300 is switched from the unlocked state to the locked state, so as to move the flange 321a of the engagement member 321 toward the second frame body 312. Furthermore, due to the resilient member 322 is located between the flange 321a and the second frame body 312, the resilient member 322 is compressed by the flange 321a and the second frame body 312. In other words, in the locked state, the resilient member 322 is compressed and stores elastic energy. Relatively, the pushing member 331 makes the first pushing portion 331a does not push the engagement module 320 (or makes the second pushing portion 331b push the engagement module 320) when the lock apparatus 300 is switched from the locked state to the unlocked state, the resilient member 322 rebounds to push the flange 321a to move away from the second frame body 312, so as to make the engagement member 321 separate from the engagement hole 121.

In the unlocked state, due to the resilient member 322 is between the flange 321a and the second frame body 312, the resilient member 322 can obstruct the movement of the flange 321a toward the second frame body 312, so as to prevent the engagement member 321 from engaging the engagement hole 121 of the steering shaft 120 at the wrong time owing to the malfunction of the engagement member 321. For example, the engagement member 321 may encounter external forces to shake during the driving of the vehicle 100, but the resilient member 322 can prevent the flange 321a from moving toward the second frame body 312 by abutting against the flange 321a, so as to prevent the engagement member 321 from interfering the steering shaft 120. In addition, even if the engagement member 321 is stuck at the engagement hole 121 of the steering shaft 120 in the unlocked state, the elastic energy stored by the resilient member 322 can drive the flange 321a to move away from the second frame body 312 and help to drive the engagement member 321 to separate from the engagement hole 121 to return to the unlock position as shown in FIG. 5A.

In some embodiments, the resilient member 322 can be a spring. For example, the resilient member 322 can be a compression spring. The compression spring is disposed on the engagement member 321 (especially on the pin portion 321b of the engagement member 321). Two opposite ends of the compression spring respectively abut against the flange 321a and the second frame body 312. In some embodiments, the resilient member 322 includes a wire spring or a plate spring.

Specifically, the pin portion 321b is connected to the flange 321a protrudes out from the second frame body 312, and configured to insert into the engagement hole 121 of the steering shaft 120. The coupling portion 321c is connected to the flange 321a and protrudes out from the first frame body 311.

As shown in FIGS. 5A and 5B with reference to FIG. 3, in some embodiments, the engagement module 320 further includes a first linkage 323. Two ends of the first linkage 323 are respectively connected to the engagement member 321 and the pushing member 331. The first linkage 323 further includes a sliding member 323a. The sliding member 323a is coupled to the coupling portion 321c and slidably pushed by the pushing member 331. Therefore, the pushing member 331 and the engagement member 321 can effectively prevent from producing excessive wear and tear therebetween.

In some embodiments, the sliding member 323a is a roller or a bearing, but the disclosure is not limited in this regard. In some other simplified embodiments, the sliding member 323a can be an end of the engagement member 321, and the shape of the sliding member 323a can be similar to a sphere, so as to achieve the purpose of effectively preventing the pushing member 331 and the engagement member 321 from producing excessive wear and tear therebetween.

As shown in FIGS. 5A and 5B with reference to FIG. 3, in some embodiments, the first linkage 323 further includes a coupling pedestal 323b. The sliding member 323a is coupled to the coupling portion 321c through the coupling pedestal 323b. The coupling pedestal 323b is configured to abut against the first frame body 311, so as to limit the swing of the engagement member 321 relative to the first axial direction A1. For example, a width of the coupling pedestal 323b in a direction perpendicular to the first axial direction A1 is greater than a width of the engagement member 321 in said direction, so that the coupling pedestal 323b will abut against the first frame body 311 first when the engagement member 321 swings relative to the first axial direction A1. As a result, the coupling pedestal 323b can effectively prevent the engagement member 321 from excessively swing relative to the first axial direction A1 and maintain the stability of movement of the engagement member 321 along the first axial direction A1.

As shown in FIG. 4, in some embodiments, the first frame body 311 has a square hole 311a. The coupling portion 321c of the engagement member 321 is in shape of a square pillar, and passes through and substantially coincides to the square hole 311a. Therefore, the engagement member 321 can be prevented from rotating relative to the first frame body 311 about the first axial direction A1. In some other embodiments, the shapes of the square hole 311a and the coupling portion 321c can be modified to other specific shapes, as long as the purpose of preventing the engagement member 321 from rotating relative to the first frame body 311 about the first axial direction A1 can be achieved.

As shown in FIGS. 5A and 5B, in some embodiments, the actuation module 330 is an electromagnetic switch, such as a solenoid. Specifically, the actuation module 330 includes a movable rod 332, a sleeve 333, a magnet 334, and an excitation winding 335. The magnet 334 and the excitation winding 335 are disposed in the sleeve 333. The movable rod 332 passes through the sleeve 333 and the excitation winding 335, and the movable rod 332 includes a magnetic core (not shown) therein. An end of the movable rod 332 exposed out from the sleeve 333 is coupled to the pushing member 331. The excitation winding 335 can generate a magnetic field while switching from the unlocked state to the locked state. The movable rod 332 is affected by the magnetic field to move from the position shown in FIG. 5A to the position shown in FIG. 5B along a direction D1 (referring to FIG. 5A) parallel to the second axial direction A2, so as to make the magnetic core of the movable rod 332 enter the magnetic field of the magnet 334 to be situated in the locked state as shown in FIG. 5B. While moving along the direction D1, the movable rod 332 moves the pushing member 331 to make the first pushing portion 331a push the engagement module 320, thereby engaging the steering shaft 120 by the engagement member 321. In addition, owing to being located in the magnetic field of the magnet 334 in the locked state, the magnetic core of the movable rod 332 can be attracted by the magnet 334. As such, the magnet 334 can maintain the position of the movable rod 332 in the locked state.

The excitation winding 335 can generate another magnetic field while switching from the locked state to the unlocked state. The movable rod 332 is affected by the magnetic field to move from the position shown in FIG. 5B to the position shown in FIG. 5A along a direction D2 (referring to FIG. 5B) parallel to the second axial direction A2, so as to make the magnetic core of the movable rod 332 leave the magnetic field of the magnet 334 to be situated in the unlocked state as shown in FIG. 5A. While moving along the direction D2, the movable rod 332 moves the pushing member 331 to make the first pushing portion 331a separate from the engagement module 320 (or to make the second pushing portion 331b contact the engagement module 320), thereby separating the engagement member 321 from the steering shaft 120 without interference.

In some embodiments, as shown in FIGS. 5A and 5B, the actuation module 330 further includes a resilient member 336 and an abutting ring 337. The abutting ring 337 is located out of the sleeve 333 and mounted to another end of the movable rod 332 away from the pushing member 331. The resilient member 336 is disposed on the movable rod 332, located out of the sleeve 333, and abutted compressed between the sleeve 333 and the abutting ring 337. When a sum of magnetic forces of the excitation winding 335 and, the magnet 334 is greater than an elastic force of the resilient member 336, the movable rod 332 moves along the direction D1 until being attracted by the magnet 334. When the excitation winding 335 applies a reverse magnetic field to make the magnetic force of the magnet 334 be smaller than the a sum of reverse forces of the excitation winding 335 and the resilient member 336, the movable rod 332 moves along the direction D2. In some embodiments, the actuation module 330 receives an electric signal of locking to move the movable rod 332 from the position as shown in FIG. 5A toward the position as shown in FIG. 5B. At this moment, if the engagement member 321 is not aligned with the engagement hole 121 of the steering shaft 120 and thus cannot move from the unlock position to the lock position, there still exists a distance from the magnet 334 to the movable rod 332, and a sum of the magnetic forces of the excitation winding 335 and the magnet 334 is still smaller than the elastic force of the resilient member 336, so that the resilient member 336 can move the movable rod 332 which moves halfway to return to the position as shown in FIG. 5A and thus the occurrence of disoperation can be prevented. Otherwise, if the actuation module 330 does not include the resilient member 336, when the actuation module 330 receives the electric signal to move the movable rod 332 from the position as shown in FIG. 5A toward the position as shown in FIG. 5B accompanied with the situation that the engagement member 321 is not aligned with the engagement hole 121 of the steering shaft 120, the movable rod 332 will continuously attracted by the magnetic force of the magnet 334 to continuously move the pushing member 331 to push the engagement module 320 along the direction D1. Under the circumstances, if the rider rotates the steering shaft 120 to make the engagement member 321 be aligned with the engagement hole 121, the steering shaft 120 will be switched to the locked state, which easily causes danger while driving.

In addition, when the actuation module 330 receives an electric signal of unlocking, the movable rod 332 which is originally located at the position as shown in FIG. 5A will not move.

In addition, in the unlocked state, owing to being between the abutting ring 337 and the sleeve 333, the resilient member 336 can obstruct the abutting ring 337 from moving toward the sleeve 333, so as to prevent the movable rod 332 from driving the pushing member 331 to move along the direction D1 owing to the malfunction of the movable rod 332. For example, even if the movable rod 332 may encounter external forces to shake during the driving of the vehicle 100, the resilient member 336 can prevent the abutting ring 337 from moving toward the sleeve 333 by abutting against the abutting ring 337, so as to prevent the movable rod 332 from driving the pushing member 331 to move along the direction D1. In some embodiments, the resilient member 336 can be a spring, such as a compression spring, but the disclosure is not limited in this regard.

In some embodiments as shown in FIG. 1, the lock apparatus 300 further includes a power supply line 160 and a battery 170. The power supply line 160 is electrically connected to the actuation module 330 and the battery 170. As such, the actuation module 330 can be powered by the battery 170. Specifically, the power supply line 160 is electrically connected to the excitation winding 335, so as to provide the power of the battery 170 to the excitation winding 335 to generate the magnetic field. In some embodiments, the battery 170 provides currents to the excitation winding 335 with different flowing directions respectively while switching from the locked state to the unlocked state and switching from the unlocked state to the locked state, so that the excitation winding 335 can generate magnetic fields of two opposite directions. The movable rod 332 can move along the direction D1 (referring to FIG. 5A) under one of the magnetic fields and along the direction D2 (referring to FIG. 5B) under another of the magnetic fields.

In some embodiments, the battery 170 is not a driving battery of the vehicle 100. In other words, the power of the battery 170 is not used to drive the vehicle 100 to move. As such, if the vehicle 100 is an electric vehicle, the actuation of the lock apparatus 300 will not affect the operation of the power unit of the electric vehicle, and the lock apparatus 300 will not fail to function properly due to the power unit of the electric vehicle runs out of power.

Figure 6A:
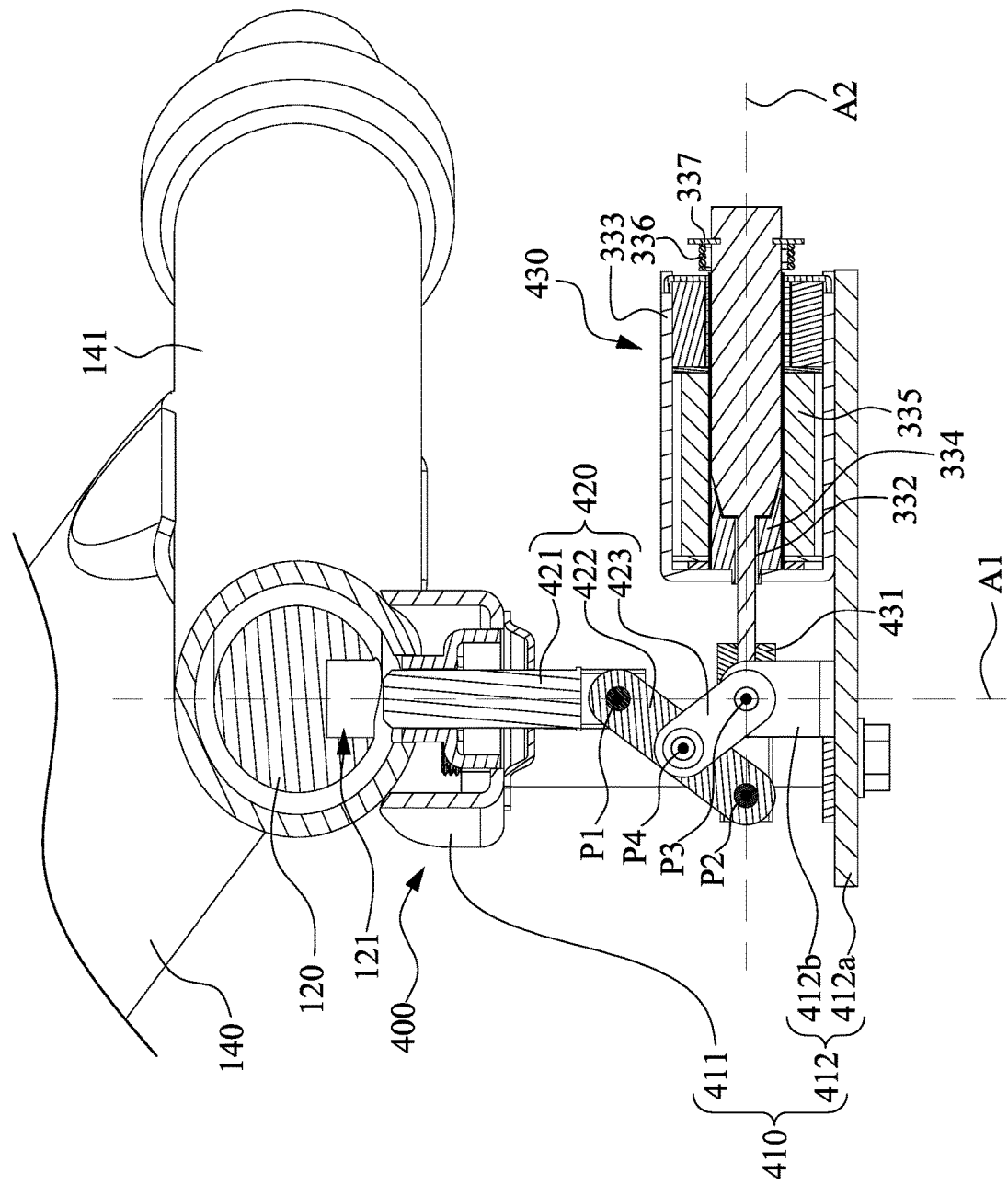
FIG. 6A is a cross-sectional view of a lock apparatus, a part of the frame, and a part of the steering shaft according to some embodiments of the disclosure, in which the engagement member is located at an unlock position.
Figure 6B:
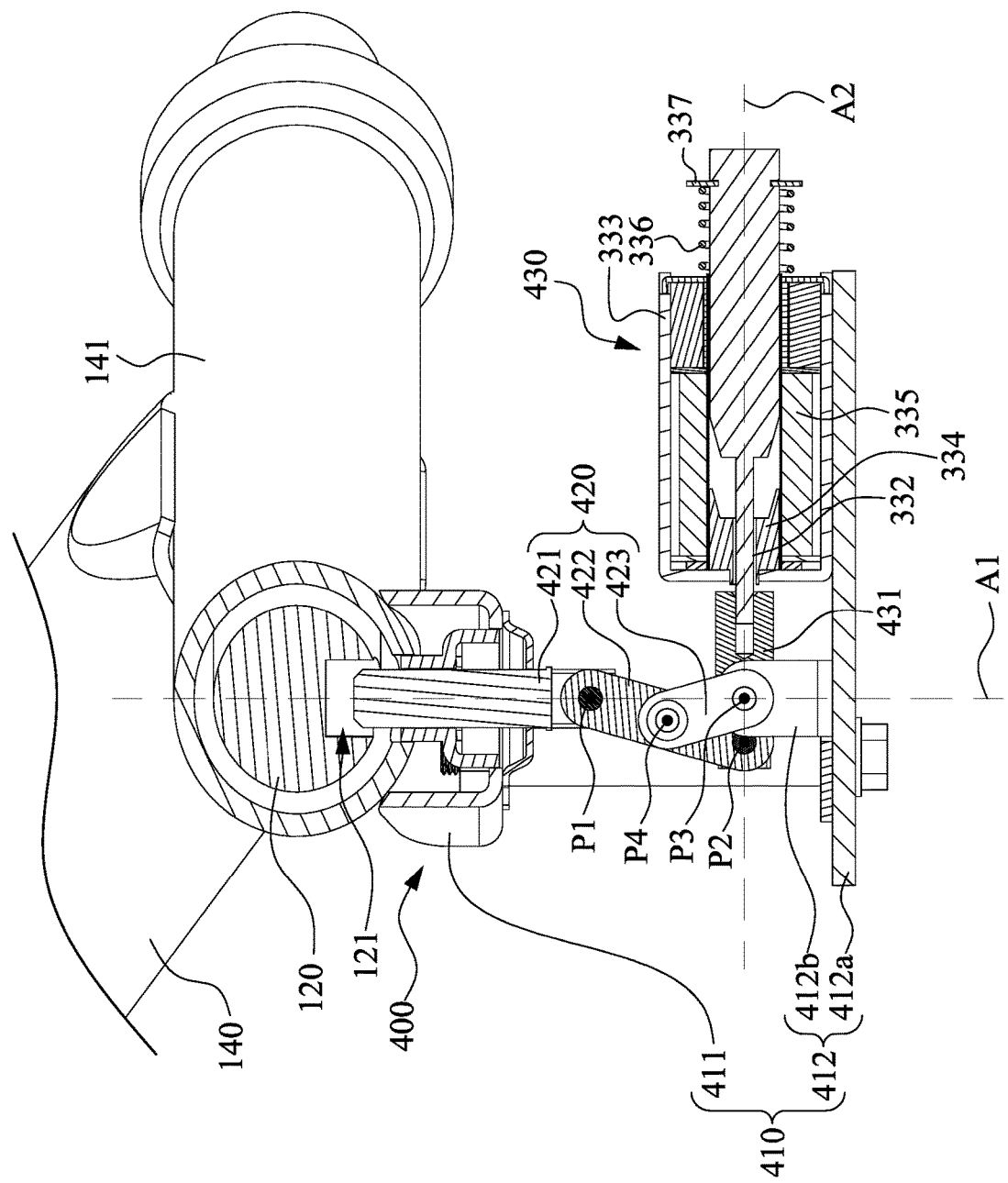
FIG. 6B is another cross-sectional view of the structure in FIG. 6A, in which the engagement member is located at a lock position.

In some embodiments as shown in FIG. 1, the lock apparatus 300 further includes a controlling device 180. The controlling device 180 is located in the vehicle 100. The power supplied from the battery 170 to the actuation module 330 is controlled by the controlling device 180. Specifically, the controlling device 180 can receive electric signals and control the power supplied from the battery 170 to the actuation module 330 according to the received electric signals, so as to move the movable rod 332 by the change of magnetic field of the actuation module 330. The electric signals received by the controlling device 180 can come from inside or outside of the vehicle 100. For example, in some embodiments, the electric signals received by the controlling device 180 can come from switches on the vehicle 100. In other words, the rider can provide the electric signals to the controlling device 180 by pressing the switches on the vehicle 100, and the controlling device 180 can control the powering and directions of current of the battery 170 to the actuation module 330 according to the electric signals, so as to drive the lock apparatus 300 to switch from the unlocked state to the locked state or from the locked state to the unlocked state. In some other embodiments, the controlling device 180 is connected to a wireless signal receiving module (not shown). The controlling device 180 receives the electric signals through the wireless signal receiving module and controls the powering and directions of current of the battery 170 to the actuation module 330 according to the electric signals. In some embodiments, the controlling device 180 can be an electronic control unit (ECU) of the vehicle 100, but the disclosure is not limited in this regard. Reference is made to FIGS. 6A and 6B. FIG. 6A is a cross-sectional view of a lock apparatus 400, a part of the frame 140, and a part of the steering shaft 120 according to some embodiments of the disclosure, in which the engagement member 421 is located at an unlock position. FIG. 6B is another cross-sectional view of the structure in FIG. 6A, in which the engagement member 421 is located at a lock position. As shown in FIGS. 6A and 6B, the lock apparatus 400 is fixed to the bushing portion 141 of the frame 140 and passes through bushing portion 141 to fasten the steering shaft 120. Structures and functions of components included hi the lock apparatus 400 and connection and action relationships among these components are described in detail below.

As shown in FIGS. 6A and 6B, in some embodiments, the lock apparatus 400 includes a bracket 410, an engagement module 420, and an actuation module 430. The bracket 410 is fixed to the frame 140 (e.g., using a welding process). The engagement module 420 is supported in the bracket 410 and has an engagement member 421. The engagement member 421 slidably passes through the bracket 410 and is configured to move to a lock position (as shown in FIG. 6B) or an unlock position (as shown in FIG. 6A) relative to the bracket 410. The actuation module 430 is connected to the bracket 410 and includes a pushing member 431. The pushing member 431 is connected to the engagement module 420. The actuation module 430 is configured to drive the pushing member 431 to move to a first position in the second axial direction A2 (i.e., the position of the pushing member 431 in FIG. 6A which corresponds to the unlock position of the engagement member 421) or a second position in the second axial direction A2 (i.e., the position of the pushing member 431 in FIG. 6B which corresponds to the lock position of the engagement member 421), and the engagement member 421 does not insert into the engagement hole 121 of the steering shaft 120. When the pushing member 431 is located at the first position in the second axial direction A2, the engagement member 421 is located at the unlock position. When the pushing member 431 is located at the second position in the second axial direction A2, the engagement member 421 is located at the lock position, and the engagement member 421 inserts into the engagement hole 121 of the steering shaft 120. It is notable that the first and second positions in the second axial direction A2 of the pushing member 431 defined in the present embodiment are opposite to the first and second positions in the second axial direction A2 of the pushing member 331 defined in the embodiments illustrated by FIGS. 5A and 5B.

In some embodiments, the actuation module 430 can be the electromagnetic switch as shown in FIG. 5A. That is, the actuation module 430 can further include the movable rod 332, the sleeve 333, the magnet 334, the excitation winding 335, the resilient member 336, and the abutting ring 337 as shown in FIG. 5A. Structures and functions of these components of the actuation module 430 and connection and action relationships among these components can be referred to related descriptions above and therefor do not discuss again here for simplicity.

In some embodiments, the lock apparatus 400 further includes a fixing frame body 411 and a supporting frame body 412. The supporting frame body 412 is fixed to the fixing frame body 411. The actuation module 430 is fixed to the supporting frame body 412.

The engagement module 420 includes a first linkage 422 and a second linkage 423. Two ends of the first linkage 422 are respectively connected to the engagement member 421 and the pushing member 431. Two ends of the second linkage 423 are respectively connected to the supporting frame body 412 and the first linkage 422.

In some embodiments, the first linkage 422 is pivotally connected to the engagement member 421 based on a first axis P1 and pivotally connected to the pushing member 431 based on a second axis P2, in which the first axis P1 and the second axis P2 are respectively located at two opposite ends of the first linkage 422. The second linkage 423 is pivotally connected to the supporting frame body 412 based on a third axis P3 and pivotally connected to the first linkage 422 based on a fourth axis P4, in which the third axis P3 and the fourth axis P4 are respectively located at two opposite ends of the second linkage 423. The first axis P1, the second axis P2, the third axis P3, and the fourth axis P4 are parallel to each other.

In some embodiments, the engagement member 421 is configured to move relative to the bracket 410 substantially along the first axial direction A1. The pushing member 431 is configured to move relative to the engagement module 420 substantially along the second axial direction A2. The first axis P1 is aligned with the third axis P3 in the first axial direction A1. The second axis P2 is aligned with the third axis P3 in the second axial direction A2.

Specifically, the supporting frame body 412 includes a bottom board 412a and a pivotal pedestal 412b. The bottom board 412a is fixed to the bracket 410 (e.g., by screws). The actuation module 430 and the pivotal pedestal 412b are fixed to the same side of the bottom board 412a. The second linkage 423 is pivotally connected to the pivotal pedestal 412b of the supporting frame body 412 based on the third axis P3. Therefore, the first axis P1 can be aligned with the third axis P3 in the first axial direction A1. In some embodiments, the second linkage 423 is pivotally connected to the first linkage 422 between the opposite ends of the first linkage 422 and pivotally connected to the pivotal pedestal 412b. Therefore, the movement of the first linkage 422 away from the actuation module 430 can be limited by the guidance of the second linkage 423 and the pivotal pedestal 412b, so as to limit the distance between the engagement member 421 pivotally connected to the first linkage 422 and the pushing member 431, thereby limiting the movement of the pushing member 431 away from the engagement member 421.

In some embodiments, the fixing frame body 411 can be welded to the bushing portion 141 of the frame 140 using a welding process, so as to fix the bracket 410 to the frame 140, but the disclosure is not limited in this regard.

Figure 7:
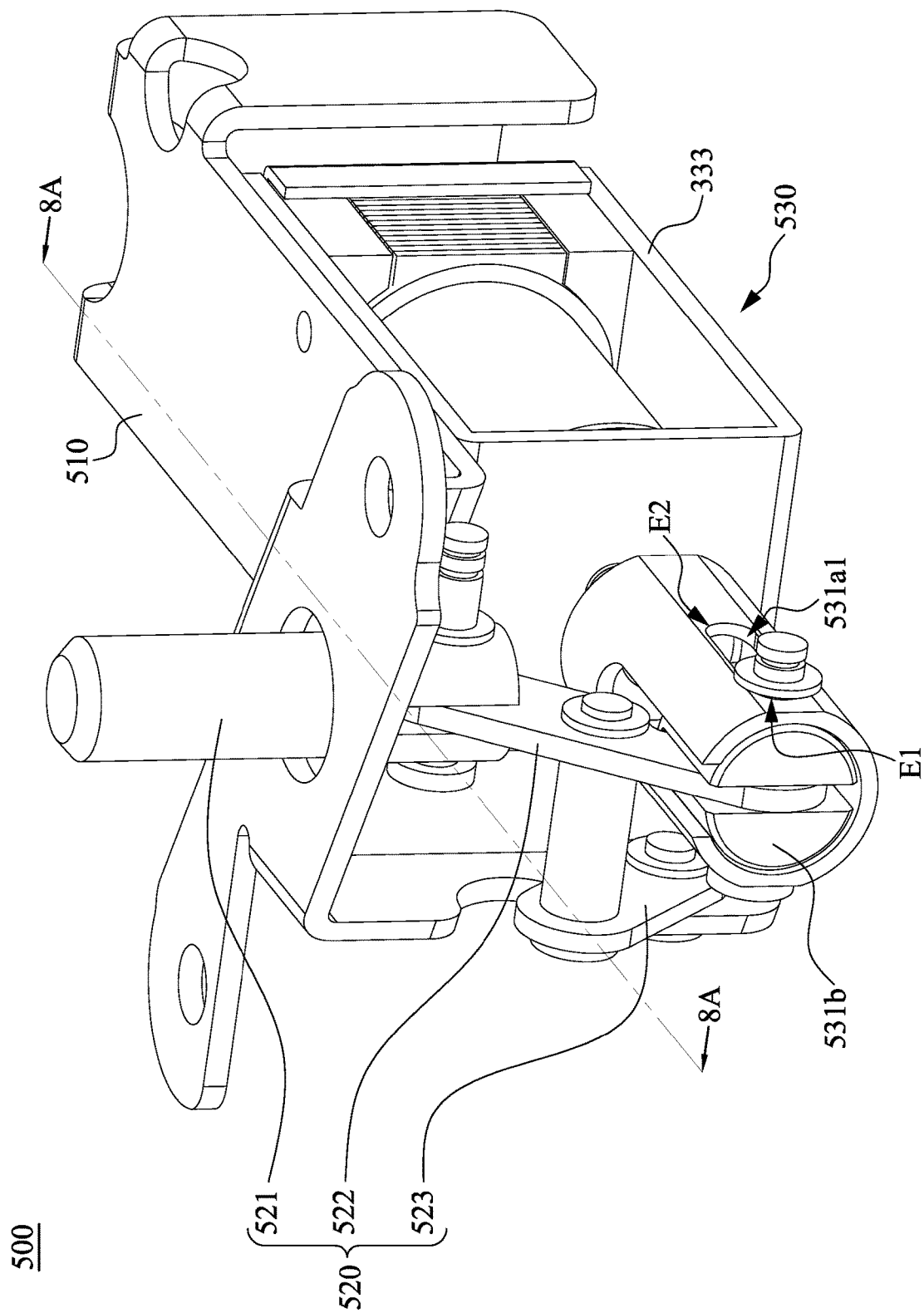
FIG. 7 is a perspective view of a lock apparatus according to some embodiments of the disclosure.
Figure 8A:
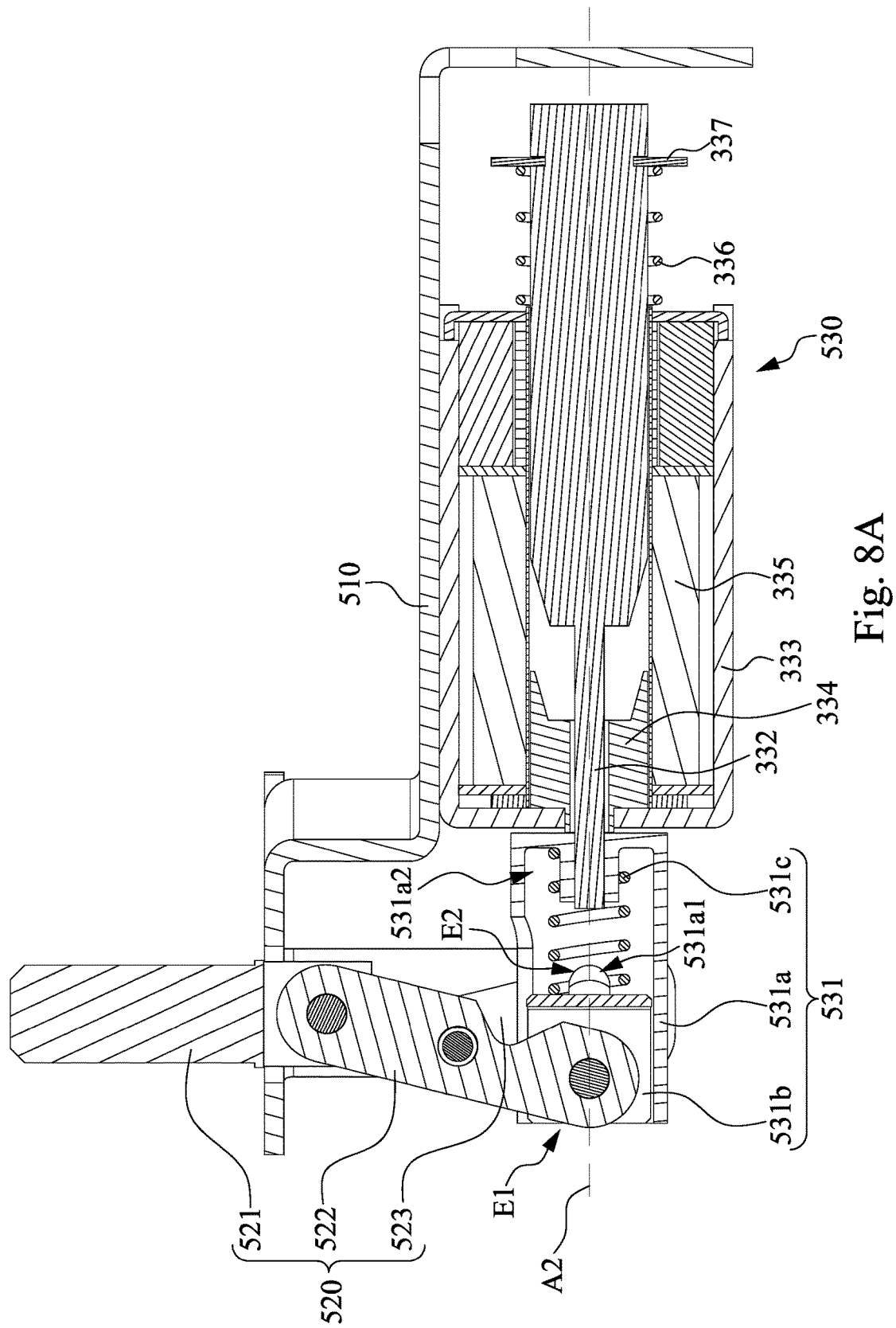
FIG. 8A is a cross-sectional view of the structure in FIG. 7 taken along line 8A-8A, in which a main body of the pushing member is located at a second position in a second axial direction, and the engagement member is located at a lock position.
Figure 8B:
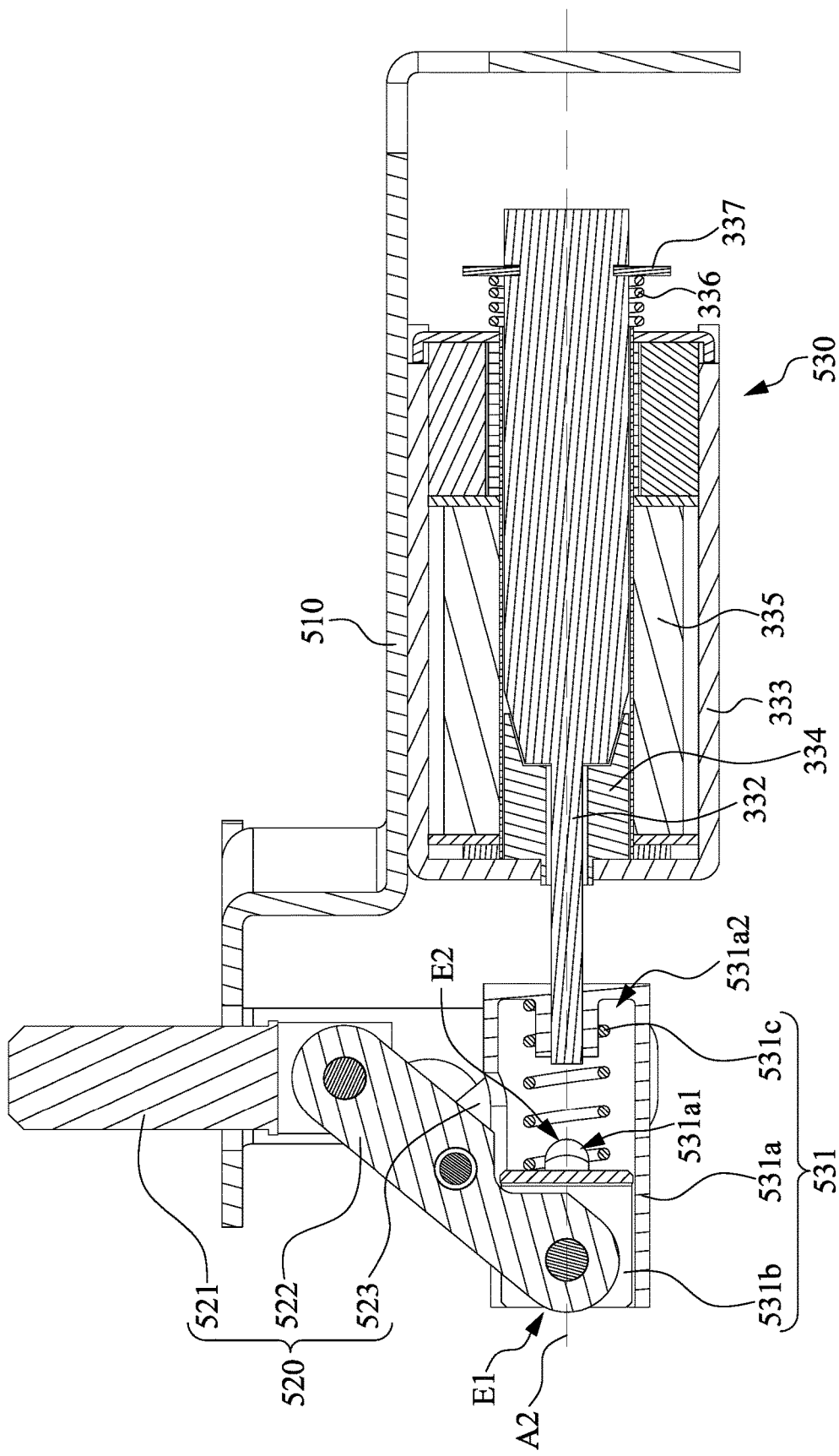
FIG. 8B is another cross-sectional view of the structure in FIG. 7 taken along line 8A-8A, in which the main body of the pushing member is located at a first position in the second axial direction, and the engagement member is located at an unlock position.
Figure 8C:
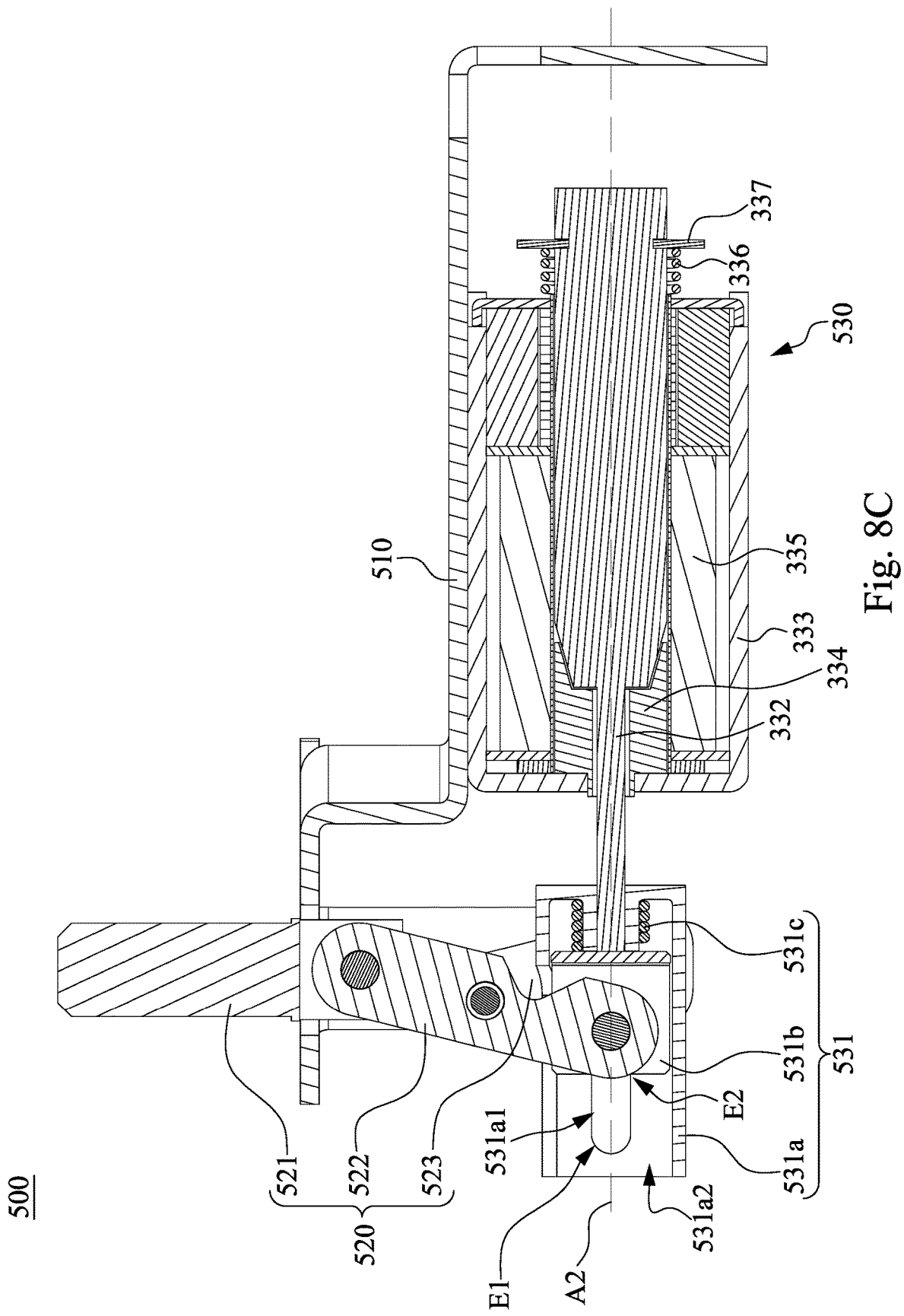
FIG. 8C is another cross-sectional view of the structure in FIG. 7 taken along line 8A-8A, in which the main body of the pushing member is located at the first position in the second axial direction, and the engagement member is located at the lock position.

Reference is made to FIGS. 7-8C. FIG. 7 is a perspective view of a lock apparatus 500 according to some embodiments of the disclosure. FIG. 8A is a cross-sectional view of the structure in FIG. 7 taken along line 8A-8A, in which a main body 531a of a pushing member 531 is located at a second position in a second axial direction A2, and an engagement member 521 is located at a lock position. FIG. 8B is another cross-sectional view of the structure in FIG. 7 taken along line 8A-8A, in which the main body 531a of the pushing member 531 is located at a first position in the second axial direction A2, and the engagement member 521 is located at an unlock position. FIG. 8C is another cross-sectional view of the structure in FIG. 7 taken along line 8A-8A, in which the main body 531a of the pushing member 531 is located at the first position in the second axial direction A2, and the engagement member 521 is located at the lock position. It is notable that the first and second positions in the second axial direction A2 of the pushing member 531 defined in the present embodiment are opposite to the first and second positions in the second axial direction A2 of the pushing member 331 defined in the embodiments illustrated by FIGS. 5A and 5B. Structures and functions of components included in the lock apparatus 500 and connection and action relationships among these components are described in detail below.

As shown in FIG. 7, in some embodiments, the lock apparatus 500 includes a bracket 510, an engagement module 520, and an actuation module 530. The bracket 510 is fixed to the frame 140 as shown in FIG. 3 (e.g., by a welding process).

The engagement module 520 is supported in the bracket 510 and includes an engagement member 521, a first linkage 522, and a second linkage 523. Structures and functions of these components of the engagement module 520 and connection and action relationships among these components are similar to those of the engagement member 421, the first linkage 422, and the second linkage 423 as shown in FIG. 6A, so related descriptions above can be referred to and therefor do not discuss again here for simplicity.

The actuation module 530 can be the electromagnetic switch as shown in FIG. 5A. That is, the actuation module 530 can further include the movable rod 332, the sleeve 333, the magnet 334, the excitation winding 335, the resilient member 336, and the abutting ring 337 as shown in FIG. 5A in addition to the pushing member 531. Structures and functions of these components of the actuation module 530 and connection and action relationships among these components can be referred to related descriptions above and therefor do not discuss again here for simplicity.

It should be pointed out that the pushing member 531 of the actuation module 530 is modified in some embodiments. Specifically, as shown in FIG. 8A, in some embodiments, the pushing member 531 includes a main body 531a, a sliding block 531b, and a resilient member 531c. The main body 531a has a slide rail 531a1. The slide rail 531a1 is substantially parallel to the second axial direction A2 and has a first end E1 and a second end E2. The actuation module 530 drives the main body 531a to move to the first position in the second axial direction A2 (i.e., the position of the main body 531a in FIG. 8B which corresponds to the unlock position of the engagement member 521) or the second position in the second axial direction A2 (i.e., the position of the main body 531a in FIG. 8A which corresponds to the lock position of the engagement member 521). The first end E1 and the second end E2 of the slide rail 531a1 are respectively close to the first position in the second axial direction A2 and the second position in the second axial direction A2. The sliding block 531b slidably is coupled to the slide rail 531a1. The first linkage 522 is pivotally connected to the sliding block 531b. The resilient member 531c is disposed between the main body 531a and the sliding block 531b and configured to push the sliding block 531b toward the first end E1.

In more detail the main body 531a of the pushing member 581 has a chamber 531a2. The sliding block 531b is slidably disposed in the chamber 531a2. The first linkage 522 passes into the chamber 531a2 to pivotally connect the sliding block 531b. The resilient member 531c is compressed between the main body 531a and the sliding block 531b in the chamber 531a2.

As shown in FIG. 8A, the actuation module 530 will drive the main body 531a of the pushing member 531 to move to the second position in the second axial direction A2 as shown in FIG. 8A while receiving the electric signal of locking, so as to move the engagement member 521 to the lock position as shown in FIG. 8A. Meanwhile, the resilient member 531c pushes the sliding block 531b to the first end E1 of the slide rail 531a1.

As shown in FIG. 8B, the actuation module 530 will drive the main body 531a of the pushing member 531 to move to the first position in the second axial direction A2 as shown in FIG. 8B while receiving the electric signal of unlocking, so as to move the engagement member 521 to the unlock position as shown in FIG. 8B. Meanwhile, the resilient member 531c still pushes the sliding block 531b to the first end E1 of the slide rail 531a1.

As shown in FIG. 8C, the actuation module 530 will still drive the main body 531a of the pushing member 531 to move to the first position in the second axial direction A2 while receiving the electric signal of unlocking under the circumstances that the engagement member 521 is stuck at the lock position (e.g., by the steering shaft 120), but the sliding block 531b disposed in the main body 531a will be pulled by the first linkage 522 to move from the first end E1 to the second end E2 of the slide rail 531a1 and compress the resilient member 531c. As a result, even if the actuation module 530 receives the electric signal of unlocking under the circumstances that the engagement member 521 is stuck at the lock position, the pushing member 531 of the present embodiment can perform cushioning and protecting functions to the actuation module 530. In addition, when the situation that the engagement member 521 is stuck at the lock position is removed, the elastic energy stored by the resilient member 531c will be immediately released to make the sliding block 531b disposed in the main body 531a return from the second end E2 to the first end E1 of the slide rail 531a1 and help to drive the engagement member 521 to return to the unlock position as shown in FIG. 8B.

The lock apparatuses 200, 300, and 400 described in the disclosure can be applied to the vehicle 100, but the disclosure is not limited in this regard. For example, the lock apparatuses 200, 300, and 400 described in the disclosure can also be applied to mechanisms of other types of transport vehicles or other non-transport vehicles. The vehicle 100 can be a scooter-type vehicle as shown in FIG. 1, but the disclosure is not limited in this regard. The vehicle 100 can also be another kind of straddle type vehicle, such as a sport motorcycle, an electric two-wheeler, a light motorcycle, or an all-terrain vehicle (ATV). The above embodiments use ignition-locks as examples of the lock apparatuses 200, 300, and 400, but the disclosure is not limited in this regard. For example, the lock apparatuses 200, 300, and 400 can also be seat locks or tank cover locks for straddle type vehicles.

According to the foregoing recitations of the embodiments of the disclosure, it can be seen that in the lock apparatus and the vehicle of the disclosure, the actuation module can drive the pushing member to push the engagement module, so as to achieve the purpose of moving the engagement member of the engagement module to the lock position or the unlock position. As such, the lock apparatus and the vehicle of the disclosure can adopt keyless start system. In the actuation method of moving the pushing member between two positions to move the engagement member, the moving direction of the engagement member can be designed to be distinct from the pushing direction of the pushing member. Moreover, the reverse impact force that the engagement module returns to the pushing member can be cushioned by the first retaining member, so as to effectively prevent the reverse impact force returned by the engagement module from directly damaging the actuation module. By retaining the pushing member with the second retaining member, the pushing member can be ensured to correctly contact the engagement module with the first pushing portion and the second pushing portion. By making the engagement member be abutted by the pushing member through the sliding member, the pushing member and the engagement member can effectively prevent from producing excessive wear and tear therebetween. By disposing the resilient member between the second frame body of the bracket and the flange of the engagement member, the engagement member can be ensured to return to the unlock position when the first pushing portion does not push the engagement module.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A lock apparatus, comprising:
a bracket;
an engagement module supported in the bracket and having an engagement member configured to move to a first position or a second position in the first axial direction relative to the bracket substantially along the first axial direction; and
an actuation module connected to the bracket and comprising a pushing member, the actuation module driving the pushing member to move to a first position or a second position in the second axial direction relative to the engagement module substantially along the second axial direction that is not parallel to the first axial direction,
wherein when the pushing member is located at the first position in the second axial direction, the engagement member is located at the first position in the first axial direction, and when the pushing member is located at the second position in the second axial direction, the engagement member is located at the second position in the first axial direction,
wherein the actuation module is an electromagnetic switch and further comprises:
a sleeve;
a movable rod passing through the sleeve, wherein the pushing member is coupled to an end of the movable rod;
an abutting ring mounted to another end of the movable rod away from the pushing member; and
a resilient member abutted between the sleeve and the abutting ring.

2. The lock apparatus of claim 1, wherein the first position in the first axial direction is an unlock position, and the second position in the first axial direction is a lock position.

3. The lock apparatus of claim 2, wherein the engagement module further comprises a first linkage, and wherein a first end of the first linkage is connected to the engagement member, and wherein a second end of the first linkage is configured to be in contact with the pushing member.

4. The lock apparatus of claim 3, wherein the pushing member has a first pushing portion, and wherein, when the pushing member is located at the first position in the second axial direction, the first pushing portion is spaced apart from the engagement module, and wherein when the pushing member is moved from the first position in the second axial direction to the second position in the second axial direction, the first pushing portion pushes the engagement module to move the engagement member to the lock position.

5. The lock apparatus of claim 4, wherein the pushing member further has a second pushing portion connected to the first pushing portion, and when the second pushing portion contacts the engagement module, the engagement member is located at the unlock position.

6. The lock apparatus of claim 5, wherein the first axial direction is substantially perpendicular to the second axial direction, and the first pushing portion and the second pushing portion are substantially parallel to the second axial direction and form a height difference in the first axial direction.

7. The lock apparatus of claim 6, wherein the pushing member further has a step portion, and the second pushing portion is connected to the first pushing portion through the step portion.

8. The lock apparatus of claim 7, wherein the second pushing portion is a flat surface, the step portion is a curved surface, and the curved surface is smoothly connected to the flat surface.

9. The lock apparatus of claim 5, wherein the bracket further comprises a second retaining member, and the second retaining member is configured to be abutted by the second pushing portion.

10. The lock apparatus of claim 9, wherein the second retaining member comprises:
a connecting block having a through hole, wherein the second pushing portion is at least partially located in the through hole; and
a fastening member fastened to the connecting block and partially protruding into the through hole to be abutted by the second pushing portion.

11. The lock apparatus of claim 4, wherein the engagement member comprises a flange, and the bracket comprises:
a first frame body facing toward the actuation module; and
a second frame body facing away from the actuation module, fixed to the first frame body, and forming an accommodating space with the first frame body, wherein the engagement member passes through the first frame body and the second frame body, and the flange is retained in the accommodating space.

12. The lock apparatus of claim 11, wherein the engagement module further comprises a resilient member, and the resilient member is located in the accommodating space and compressed between the second frame body and the flange.

13. The lock apparatus of claim 11, wherein the engagement member further comprises a pin portion, and the pin portion is connected to the flange and protrudes out from the second frame body.

14. The lock apparatus of claim 11, wherein the engagement member further comprises a coupling portion, the coupling portion is connected to the flange and protrudes out from the first frame body, the first linkage further comprises a sliding member, and the sliding member is configured to be slidably pushed by the pushing member.

15. The lock apparatus of claim 14, wherein the first linkage further comprises a coupling pedestal, the sliding member is connected to the coupling portion through the coupling pedestal, and the coupling pedestal is configured to abut against the first frame body.

16. The lock apparatus of claim 4, wherein the engagement member passes through the bracket, the first linkage further comprises a sliding member, and the sliding member is coupled to an end of the engagement member close to the pushing member and configured to be slidably abutted by the pushing member.

17. The lock apparatus of claim 16, wherein the first linkage further comprises a coupling pedestal, the sliding member is connected to the end of the engagement member close to the pushing member through the coupling pedestal, and the coupling pedestal is configured to abut against the bracket.

18. A vehicle, comprising:
a frame having a bushing portion;
a steering shaft rotatably disposed in the bushing portion; and
the lock apparatus of claim 2, wherein the bracket is fixed to the bushing portion,
wherein when the engagement member is located at the lock position, the engagement member passes through the bushing portion and is engaged with the steering shaft, and when the engagement member is located at the unlock position, the engagement member is separated from the steering shaft.

19. A lock apparatus, comprising:
a bracket;
an engagement module supported in the bracket and having an engagement member configured to move to a first position or a second position in the first axial direction relative to the bracket substantially along the first axial direction; and
an actuation module connected to the bracket and comprising a pushing member, the actuation module driving the pushing member to move to a first position or a second position in the second axial direction relative to the engagement module substantially along the second axial direction that is not parallel to the first axial direction,
wherein when the pushing member is located at the first position in the second axial direction, the engagement member is located at the first position in the first axial direction, and when the pushing member is located at the second position in the second axial direction, the engagement member is located at the second position in the first axial direction,
wherein the first position in the first axial direction is an unlock position, and the second position in the first axial direction is a lock position,
wherein the engagement module further comprises a first linkage, and wherein a first end of the first linkage is connected to the engagement member, and wherein a second end of the first linkage is configured to be in contact with the pushing member,
wherein the pushing member has a first pushing portion, and wherein, when the pushing member is located at the first position in the second axial direction, the first pushing portion is spaced apart from the engagement module, and wherein when the pushing member is moved from the first position in the second axial direction to the second position in the second axial direction, the first pushing portion pushes the engagement module to move the engagement member to the lock position,
wherein the bracket further comprises a first retaining member located at a side of the pushing member away from the engagement module, and the first retaining member is configured to limit a movement of the pushing member away from the engagement module.

20. The lock apparatus of claim 19, wherein the first retaining member is a screw fastened to the bracket.

* * * * *